United States Patent
Taga et al.

[19]

[11] Patent Number: 5,915,801
[45] Date of Patent: Jun. 29, 1999

[54] REGENERATIVE BRAKE CONTROLLER FOR CONTROLLING VALUE OF REGENERATIVE BRAKING TORQUE SIMULATING ENGINE BRAKING TORQUE

[75] Inventors: Yutaka Taga, Aichi-ken; Ryuji Ibaraki, Toyota, both of Japan

[73] Assignee: Toyota Jidosha Kabushiki Kaisha, Toyota, Japan

[21] Appl. No.: 08/660,595

[22] Filed: Jun. 11, 1996

[30] Foreign Application Priority Data

Jul. 18, 1995 [JP] Japan .................................. 7-181461

[51] Int. Cl.$^6$ .................................................. B60L 7/10
[52] U.S. Cl. .......................................... 303/152; 318/376
[58] Field of Search ...................... 303/151, 152, 303/3, 15, 20; 318/376, 363, 371, 372, 375

[56] References Cited

U.S. PATENT DOCUMENTS

| 4,730,151 | 3/1988 | Florey et al. ............................. 318/376 |
| 5,367,455 | 11/1994 | Kitagawa et al. .................. 364/424.01 |
| 5,542,754 | 8/1996 | Aoki et al. ........................... 303/152 X |
| 5,615,933 | 4/1997 | Kidston et al. ......................... 303/152 |

FOREIGN PATENT DOCUMENTS

| 43 24 010 | 1/1995 | Germany . |
| 44 37 322 | 5/1995 | Germany . |
| 51-125819 | 11/1976 | Japan . |
| 4-297330 | 10/1992 | Japan . |
| 5-191904 | 7/1993 | Japan . |

*Primary Examiner*—Peter M. Poon
*Attorney, Agent, or Firm*—Oblon, Spivak, McClelland, Maier & Neustadt, P.C.

[57] ABSTRACT

A regenerative brake controller for controlling a value of regenerative braking torque to simulate engine braking torque. When the shift lever is in the D range, from a first control map which correlates the vehicle speed and the like with target braking torque or target deceleration, the controller reads the target braking torque or target deceleration corresponding to the vehicle speed immediately before the release of the accelerator pedal, and controls the vehicle components on the basis of the read target braking torque or target deceleration such that the regenerative braking torque corresponding to the engine braking torque is produced. When the shift lever is in the engine braking range, the controller detects the shift lever position in this range, determines the target braking torque or target deceleration by referring to the map, and on the basis of the vehicle speed and the like immediately before the release of the accelerator pedal and the shift lever position in the engine braking range, and controls the vehicle components according to the determined target braking torque or target deceleration such that the regenerative braking torque corresponding to the engine braking torque is produced. In connection with the regenerative braking torque corresponding to the engine braking torque, the vehicle drivability can be improved.

11 Claims, 6 Drawing Sheets

REGENERATIVE BRAKE CONTROLLER FOR CONTROLLING VALUE OF REGENERATIVE BRAKING TORQUE SIMULATING ENGINE BRAKING TORQUE

BACKGROUND OF THE INVENTION a. Field of the Invention

The invention relates to a regenerative brake controller which is mounted on a motor vehicle such as an electric vehicle or an electric locomotive.

b. Description of the Related Art

Drivers use engine braking which stops an internal combustion engine vehicle by the pumping work and friction torque of the internal combustion engine. In some types of motor type vehicles there is a function of controlling the regenerative braking torque so that the engine braking torque is simulated by the regenerative braking torque, in order to make the drive feeling similar to that of an internal combustion engine vehicle (see, e.g., Japanese Patent Laid-Open Publication No. Sho 51-125819). The engine braking torque of the internal combustion engine vehicle is determined according to the pumping work and friction torque of the internal combustion engine and, therefore it is substantially constant except for when the number of revolutions of the internal combustion engine is low. In order to give the driver a feeling similar to that of the internal combustion engine vehicle, in the above-mentioned motor type vehicle, the regenerative braking torque is controlled so as to simulate the engine braking torque to keep it at a substantially constant level.

However, even when the braking torque is identical, its effect is varied when a vehicle running resistance or vehicle conditions are changed. For example, when the vehicle's load, such as total weight of cargo and passengers is varied, or when a road gradient is varied, the effect of engine braking varies. Therefore, in a conventional vehicle, to deal with the change in the vehicle running resistance, when making use of the engine braking, the driver is often required to further depress the brake pedal or operate the shift lever to a lower gear. When the frequency of such operations is increased, the vehicle drivability deteriorates.

Besides, in the conventional vehicle, the driver has no influence on the engine braking effect except for the operation of the shift lever. Thus, when the driver is requesting generation of a large braking torque before depressing the brake pedal, e.g., when the accelerator pedal is quickly released and the brake pedal is then depressed, the engine braking effect is only at a level corresponding to where the shift lever was positioned immediately after the accelerator pedal is released, and such a low effect is a problem in the conventional motor type vehicle.

SUMMARY OF THE INVENTION

One object of the invention is to eliminate the operation of the brake pedal or the shift lever which is conventionally performed by the driver to deal with the changes in the vehicle running resistance or the vehicle conditions. Another object of the invention is to provide a vehicle which can produce a large engine braking effect when a large braking torque is required, before carrying out the braking operation. According to the invention, these objects can be achieved by controlling the regenerative braking torque so as to simulate the engine braking torque, in the motor type vehicle according to various physical quantities reflecting the vehicle running resistance, vehicle conditions, or their changes. Also, such objects of the invention can be achieved by using a common regenerative braking torque determination procedure using a map.

A first aspect of the invention relates to a regenerative brake controller which comprises means for determining a target braking torque based on a basic quantity which is at least one of a vehicle speed immediately on the accelerator pedal is released, an accelerator pedal releasing speed, a road gradient, a vehicle weight, a relative positional relationship with a forward obstruction, and a friction coefficient of a road surface; and means for controlling regenerative braking torque simulating engine braking torque based on the target braking torque. In this aspect, the target braking torque which is the control target of the regenerative braking torque is determined on the basis of at least one of the vehicle speed immediately before the accelerator pedal is released, the accelerator pedal releasing speed, the road gradient, the vehicle weight, the relative positional relationship with a forward obstruction, and the friction coefficient of the road surface. Therefore, the magnitude of the regenerative braking torque simulating the engine braking torque is varied according to such basic quantities. As a result, the engine braking torque can be simulated taking account of the change in the vehicle conditions, and the vehicle drivability is improved. Particularly, determining the target braking torque according to the accelerator pedal releasing speed makes it possible to produce a large regenerative braking torque just after the accelerator pedal is quickly released before depressing the brake pedal, for example. Thus, even when a large braking torque is required, the controller according to the present invention can respond to the torque request without significant delay.

A second aspect of the invention relates to a regenerative brake controller which comprises means for determining a target deceleration based on a basic quantity which is at least one of a vehicle speed immediately before an accelerator pedal is released, an accelerator pedal releasing speed, a relative positional relationship with a forward obstruction, and a friction coefficient of a road surface; and means for controlling regenerative braking torque simulating engine braking torque to realize the target deceleration. In this aspect, the regeneration braking torque is controlled so that the target deceleration is realized, whereas the target deceleration is determined according to at least one of the vehicle speed immediately before the accelerator pedal is released or the accelerator pedal releasing speed are varied, the regeneration braking torque simulating the engine braking torque is also varied accordingly. Thus, this aspect also has the advantage of improving drivability as in the first aspect. In addition, since the target deceleration varies according to the change in the vehicle running resistance and introduces this factor into the control of the regeneration braking torque, the required deceleration can be obtained regardless of the change in the vehicle running resistance such as the road gradient and the vehicle weight. In other words, this aspect has an advantage that the detection or input of the road gradient, the vehicle weight and other factors is unnecessary, compared to the first aspect in which the detection or input of the road gradient, the vehicle weight and other factors is preferable to determine the target braking torque.

The invention can be embodied as a controller in which the target braking torque or target deceleration is changed according to the operation of a manual shift member. The manual shift member here is a member such as a shift lever used for a shift device having an engine braking range. In one embodiment of the invention, when the manual shift member is shifted in the engine braking range by the driver's operation, an engine braking shift position signal, the value of which represents the position of the member in the engine braking range is produced. The regenerative braking torque is controlled to simulate the engine braking torque according to the target braking torque or target deceleration which is determined according to the value of the engine braking shift position signal. Therefore, in the state that the manual shift member is into the engine braking range, the braking torque or deceleration expected by the user (vehicle driver) is realized by the operation of the manual shift member. Thus, the vehicle operation reflecting the user's intention is realized by relatively simple members.

The invention can be achieved by using map means. The map means refers to relational data which correlates the basic quantity to be used to determine the target braking torque or the target deceleration with the target braking torque or the target deceleration in the first and second aspects. One embodiment in the invention refers to the map means when the target braking torque or the target deceleration is to be determined.

DESCRIPTION OF THE PREFERRED EMBODIMENTS

Preferred embodiments of the invention will be described with reference to the accompanying drawings.

Figure 1:
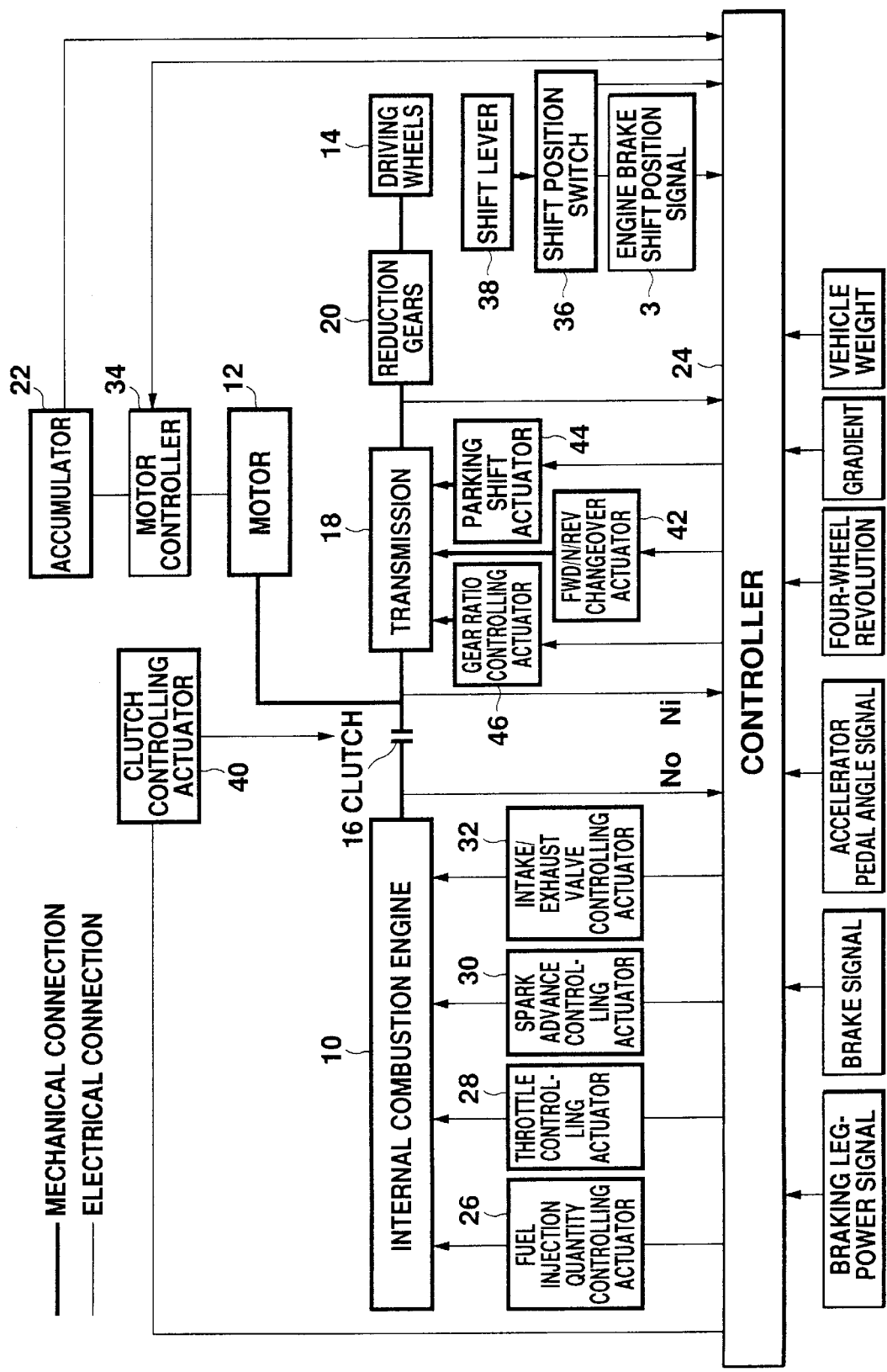
FIG. 1 is a block diagram showing the system configuration of a parallel hybrid vehicle according to one embodiment of the invention.

FIG. 1 shows the configuration of a vehicle according to one embodiment of the invention. The vehicle shown here is a parallel hybrid vehicle, namely a type of vehicle which can carry out parallel transmission of the output torque of an internal combustion engine 10 and the output torque of a motor 12 to driving wheels 14.

The output shaft of the internal combustion engine 10 is connected to the driving wheels 14 through a clutch 16, a transmission 18 and reduction gears 20. Therefore, when the internal combustion engine 10 and the transmission 18 are connected through the clutch 16, the driving wheels 14 can be driven by the output torque of the internal combustion engine 10. The output shaft of the motor 12 is also connected to the driving wheels 14 through the transmission 18 and the reduction gears 20. Therefore, when the internal combustion engine 10 and the transmission 18 are connected by the clutch 16, the acceleration and deceleration of the internal combustion engine 10 can be assisted by the motor 12. Further, when the internal combustion engine 10 and the transmission 18 are disengaged by the clutch 16, the driving wheels 14 can be driven by the motor 12 only (namely, the internal combustion engine 10 does not exert drag on the motor 12). In particular, to slow the vehicle down, the internal combustion engine 10 and the transmission 18 are disengaged by the clutch 16, and braking energy can be accumulated in an on-board accumulator (battery or large-capacitance capacitor) 22 by the motor 12.

The vehicle shown in FIG. 1 is controlled by a controller 24 only. To control the vehicle, the controller 24 receives a brake signal which indicates that the brake pedal is depressed, a braking leg-power signal which indicates a leg power depressing the brake pedal, an accelerator pedal angle signal which indicates an accelerator pedal angle, the number of revolutions of four wheels which indicates the number of revolutions of the driving wheels 14 and slave wheels, a road gradient which is detected by an on-board gradient sensor, the vehicle weight which is detected by an on-board weight sensor, a shift position signal which is produced by a shift position switch 36 and indicates in which range a shift lever 38 is positioned, and an engine brake shift position signal 3 which is produced when the shift lever 38 is positioned in the engine brake range and indicates the position of the shift lever 38 in the engine brake range.

For example, when the accelerator pedal is depressed, the controller 24 detects the accelerator pedal angle from the accelerator pedal angle signal, and calculates the required output torque in accordance with the detected result. The controller 24 controls the internal combustion engine 10, the motor 12 and the clutch 16 to obtain the output torque. Specifically, the controller 24 gives a command to a clutch controlling actuator 40 to engage the clutch 16 in order to connect the internal combustion engine 10 and the transmission 18, and gives a command to actuators 26, 28, 30, 32 to control the fuel injection, throttle angle, spark advance, and air-intake and exhaust of the internal combustion engine 10, respectively, thereby producing the necessary output torque from the internal combustion engine 10. When a quick acceleration or deceleration is required but it is judged that the necessary output torque cannot be provided by the internal combustion engine 10 alone, the controller 24 operates the motor 12 with the clutch 16 engaged, so that the necessary output torque is produced by the combination of the internal combustion engine 10 and the motor 12. At that time, the controller 24 calculates a command representing torque to be output from the motor 12 with reference to the number of revolutions of four wheels, and sends it to a motor controller 34 to control the power conversion using the motor controller 34 so as to supply the necessary driving power from the accumulator 22 to the motor 12 (or to supply regenerative power from the motor 12 to the accumulator 22). A transmission and speed-increasing/reduction gears may be provided between the motor 12 and the transmission 18.

The controller 24 controls actuators 42, 44, 46 according to the range in which the shift lever 38 is positioned or the position of the shift lever 38 when it is positioned in the engine braking range. For example, when the shift lever 38 is in the forward (FWD), neutral (N) or reverse (REV) range, the gear ratio of the transmission 18 is changed by the actuator 42, and when the shift lever 38 is in the parking (P) range, the parking mechanism of the transmission 18 is operated by the actuator 44. When the shift lever 38 is in the engine braking range, the controller 24 gives a command to the actuator 46 according to the position of the shift lever 38 within the engine braking range given by the engine braking position signal, to change the gear ratio of the transmission 18. The engine braking shift position signal can be produced by providing the shift lever 38 with a potentiometer to detect the position of the shift lever 38. In the case that a floor shift lever is used as the shift lever 38, it is preferable to be provided in the same way as in a conventional automatic transmission (AT) vehicle so that the regenerative braking torque simulating engine braking torque (to be described afterwards) is increased by pulling the shift lever 38 (toward the driver) in the direction away from the neutral position.

Figure 2:
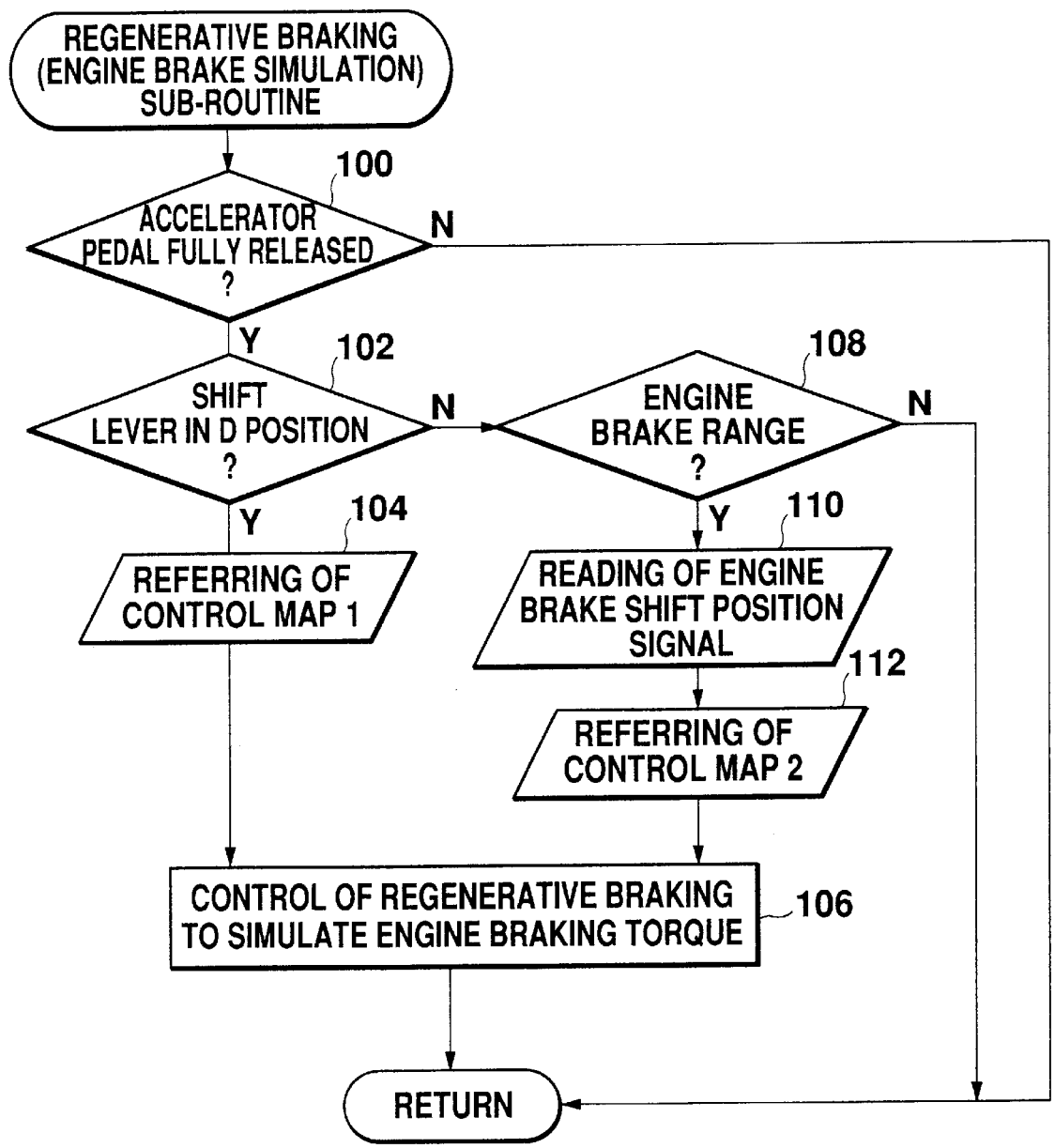
FIG. 2 is a flowchart showing the operation of a controller in the above embodiment, particularly a flow of operations for producing the regenerative braking torque simulating the engine braking torque.

FIG. 2 shows one example of the operation of the controller 24 according to the invention, particularly the operation for producing the regenerative braking torque simulating the engine braking torque. The operation shown in this drawing is repeated at a prescribed frequency.

In FIG. 2, the controller 24 first judges, according to the accelerator pedal angle signal, whether the accelerator pedal is completely released (100). In other words, the controller 24 judges whether the accelerator pedal is depressed or not. When it is judged that the accelerator pedal is depressed, the operation of the controller 24 leaves the routine shown in this drawing. When it is judged that the accelerator pedal is not depressed, the operation of the controller 24 goes to step 102.

In step 102, the controller 24 judges, according to the shift position signal from the shift position switch 36, whether the shift lever 38 is in the D range. Specifically, it is judged whether the shift lever 38 is positioned in a range to drive the vehicle, e.g., a forward (FWD) or reverse (REV) range. When it is judged that the shift lever 38 is in the D range, the controller 24 reads the target braking torque from a first control map (104) and issues a command to the motor controller 34 so as to read the target braking torque as the regenerative braking torque (106).

Figure 3:
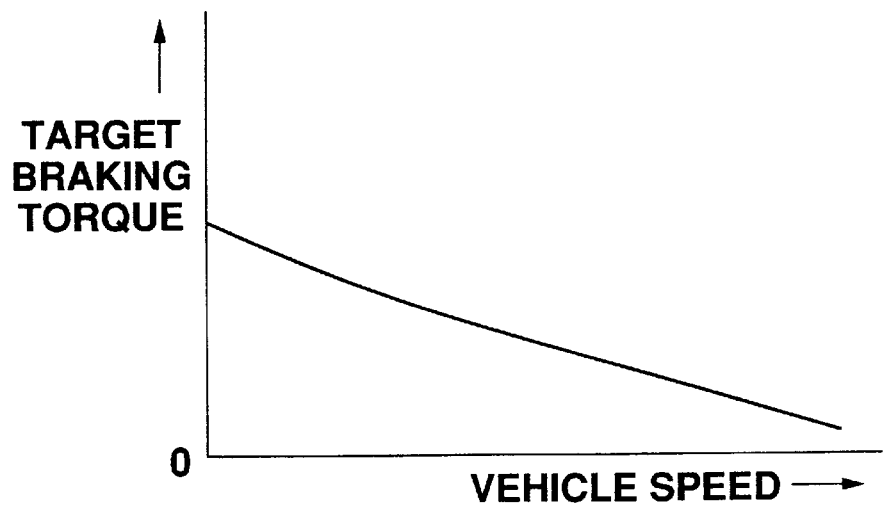
FIG. 3 and FIG. 4 are graphs each showing one example of first and second control maps.

The first control map has the contents as shown in FIG. 3 for example. In this drawing, the vehicle speed is correlated with the target braking torque, and the target braking torque decreases as the vehicle speed increases. In the step 104, the controller 24 determines the target braking torque with reference to the first control map according to the vehicle speed, which is given by the number of revolutions of four wheels, immediately before the complete release of the accelerator pedal. By determining the target braking torque according to the first control map, the engine braking torque can be simulated by the regenerative braking torque taking account of the vehicle speed, thereby improving drivability considerably.

Such advantages can be clarified by specifically comparing with the present popular AT vehicles. Since the engine revs are lowered as the AT vehicle speed is lowered, the effect of engine braking is lowered. To remedy such a disadvantage, the shift lever can be operated to select the engine braking range to supplement the effect of the engine braking, but to attain the effect of the engine braking, operability is deteriorated because the shift lever must be operated manually. In this embodiment of the invention, the target braking torque is adjusted according to the vehicle speed to realize a vehicle provided with better operability than the AT vehicle and with a similar engine braking feeling as the AT vehicles.

Besides, when it is judged in the step 102 that the shift lever 38 is in the range other than the D range, the controller 24 judges whether the shift lever 38 is in the engine braking range (108). When the shift lever 38 is not in the engine brake range, the operation of the controller 24 leaves the routine shown in FIG. 2. On the other hand, when it is judged that the shift lever 38 is in the engine braking range, the controller 24 reads the value of the engine braking shift position signal (110), and uses the obtained result to read the target braking torque from a second control map (112). The controller 24 issues a command to the motor controller 34 to control the regeneration operation by the motor 12 so as the read the target braking torque (106).

Figure 4:
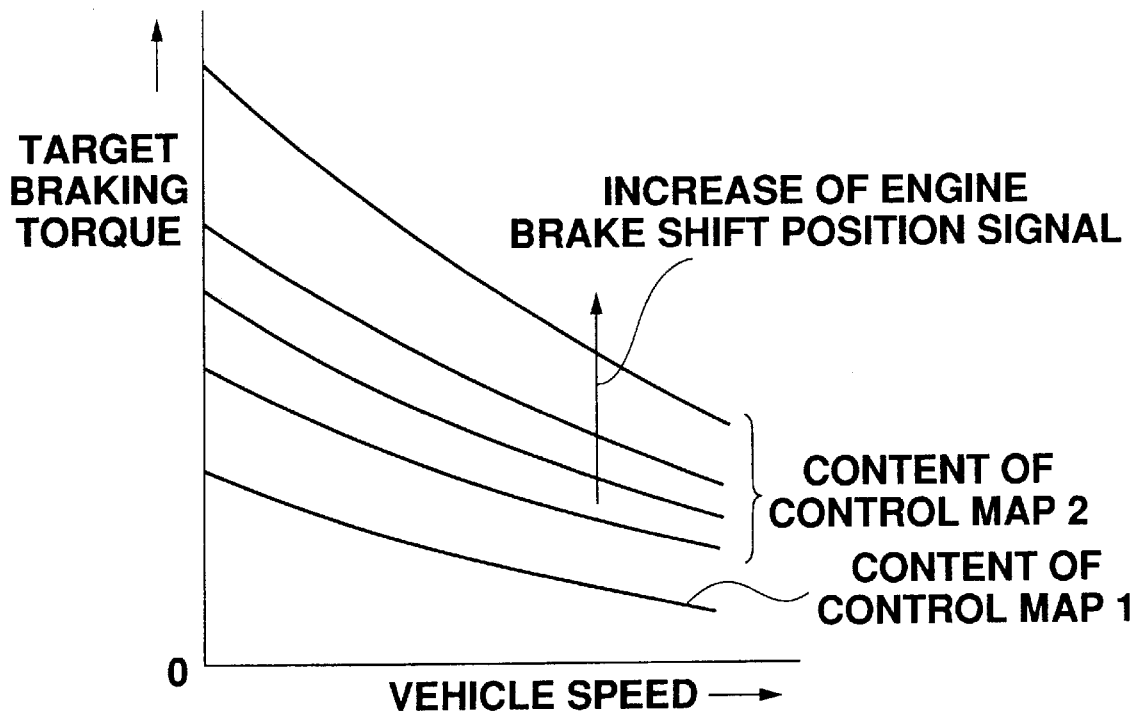

The second control map here has the content as shown in FIG. 4, for example. This example is preferably used when FIG. 3 is used as the first control map, namely, when a map for changing the target braking torque according to the speed is to be used. As shown in FIG. 4, the second control map also correlates the speed with the target braking torque, and the target braking torque lowers as the vehicle speed increases. Furthermore, the target braking torque given by the second control map has a value greater than that of the target braking torque given by the first control map. In addition, the second control map has the value of the engine braking shift position signal as a parameter, and when the value of the engine braking shift position signal increases, namely when the shift lever 38 is operated by the driver and shifted to a position requiring greater braking torque in the engine braking range, the target braking torque given by the second control map becomes a greater value. In the step 112, the controller 24 refers to the second control map on the basis of the vehicle speed immediately before the complete release of the accelerator pedal and the value of the engine braking position signal, thereby determining the target braking torque.

Thus, since this embodiment uses, as the second control map, a map which varies the target braking torque according to the vehicle speed in the same way as the first control map, even when the shift lever 38 is in the engine braking range, the braking torque according to the vehicle speed can be realized as in the case where the shift lever 38 is in the D range, enabling the improvement of drivability with the shift lever 38 in the engine braking range. Besides, since the second control map provides greater target braking torque than the first control map, when the shift lever 38 is in the engine braking range, the engine braking torque obtained can be greater than the engine braking torque obtained when the shift lever 38 is in the D range. In addition, since the vehicle speed and also the engine braking shift position signal are used as parameters to read the target braking torque from the second control map, when the driver operates the shift lever 38 into the engine braking range, the value of the regenerative braking torque corresponding to the engine braking torque can be changed to the required value. Accordingly, maneuverability can be improved and the effect of regenerating the braking energy to the accumulator 22 can also be improved.

Furthermore, when the engine braking shift position signal is produced by a potentiometer which is provided on the shift lever 38, a continuous (or discrete but high resolution) engine braking shift position signal can be obtained, so that the target braking torque can be changed substantially continuously according to the position of the shift lever 38 in the engine braking range. When the shift lever 38 is a floor shift lever, the same shifting operability as in the AT vehicle can be attained by increasing the regenerative braking torque when the shift lever 38 is pulled (toward the driver) in the direction away from the neutral position in the engine braking range. In addition, to control the regenerative braking torque according to the target braking torque determined according to the vehicle speed, it is preferable to change the gear ratio of the transmission 18 by the actuator 46. For example, in a case that a much greater regenerative braking torque is required, the number of revolutions of the motor 12 is decreased by lowering the gear ratio of the transmission 18. Since it is generally true that the maximum output torque of the motor 12 increases when its number of revolutions is in a low range, the above-mentioned control can reliably realize the required regenerative braking torque (required braking torque).

Figure 5:
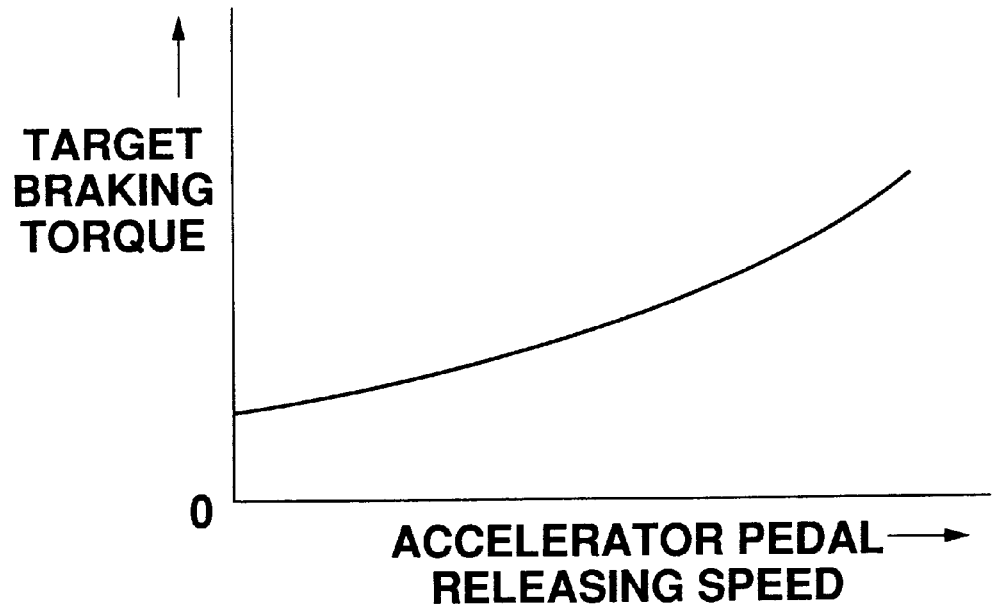
FIG. 5, FIG. 6, FIG. 7, FIG. 8 and FIG. 9 are graphs showing other examples of the first control map.

FIG. 5 shows another example of the first control map used in this embodiment. It is seen that the accelerator pedal releasing speed, namely a speed, of releasing the accelerator pedal by the vehicle driver, is correlated with the target braking torque. In this drawing, the target braking torque lowers as the accelerator pedal releasing speed is increased. In a case that the first control map having such a content is used to determine the target braking torque according to the accelerator pedal releasing speed immediately before the complete release of the accelerator pedal, when a foot is quickly taken off the accelerator pedal to depress the brake pedal, namely greater braking torque is required, the regenerative braking torque corresponding to the engine braking torque greater than usual can be attained, so that a vehicle having better operability than before can be obtained. It will be understood that the accelerator pedal releasing speed may be calculated by the controller, based upon the accelerator pedal angle signal.

Figure 6:
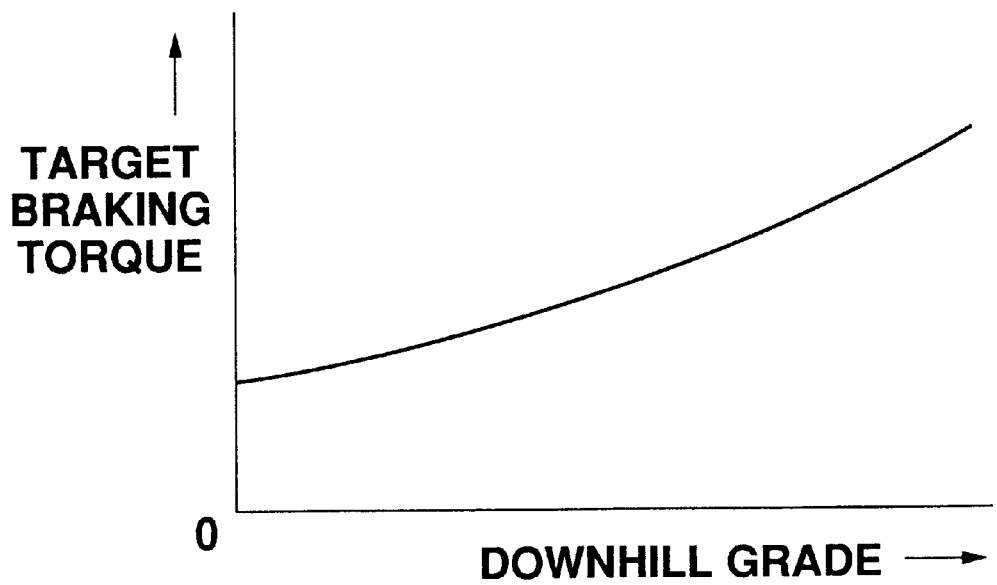
Figure 7:
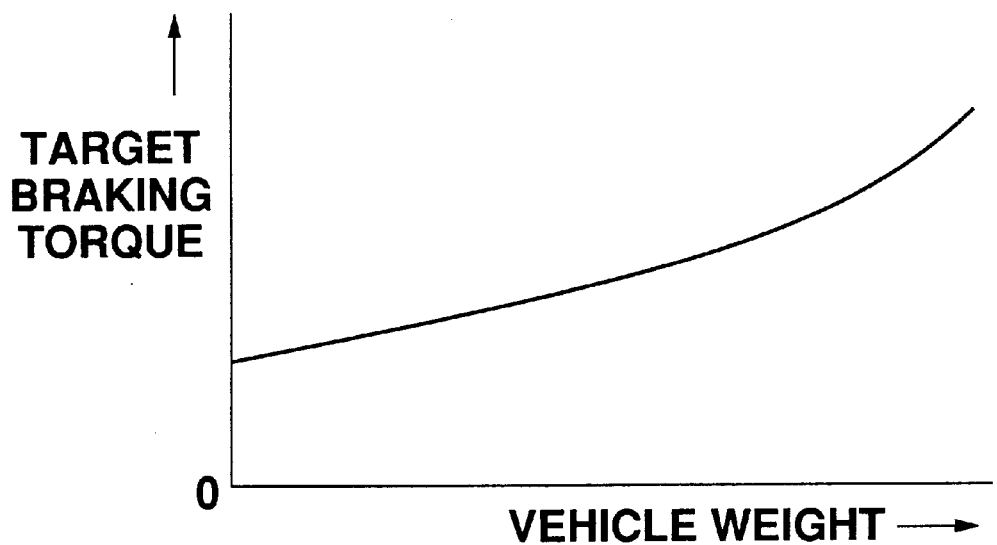

FIG. 6 shows another example of the first control map. It is seen that the downhill gradient is correlated with the target braking torque, indicating that the target braking torque increases as the downhill gradient becomes steep. FIG. 7 shows still another example of the first control map. It is seen that the vehicle weight is correlated with the target braking torque, indicating that the target braking torque increases as the vehicle weight is increased. When the first control maps shown in these drawings are used, a difference in a load capacity such as passengers and freight, and a hill gradient, namely a change in vehicle running resistance, can be reflected in the value of the regenerative braking torque simulating the engine braking torque. Therefore, a frequency of operations with which the vehicle driver increases a force to depress the brake pedal or changes the engine braking position to a lower-speed level is decreased, resulting in the vehicle having better operability than before.

Figure 8:
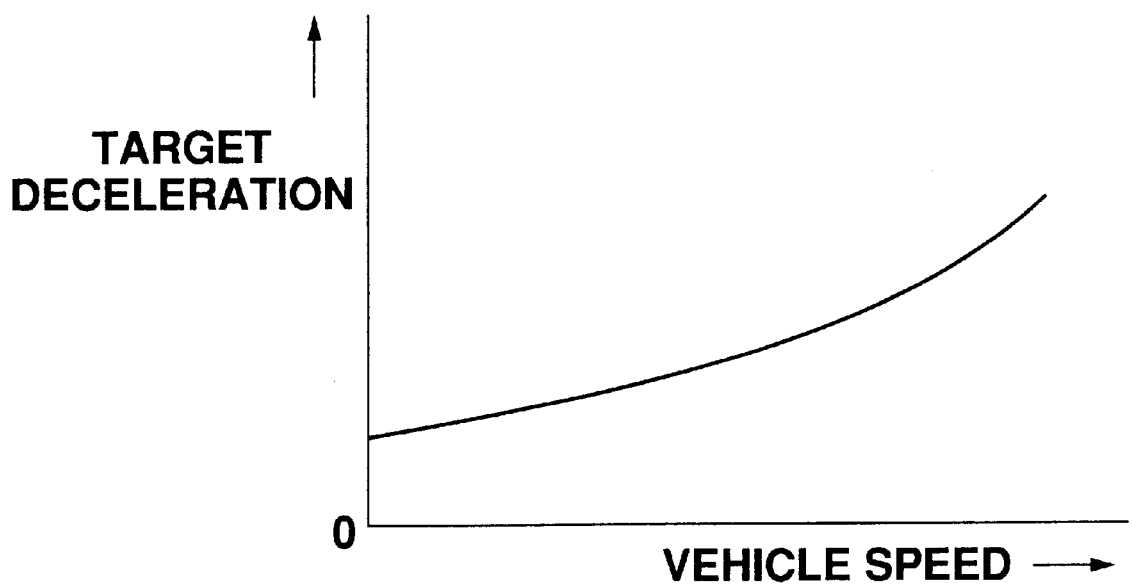

FIG. 8 shows another example of the first control map usable in this embodiment. It is seen that the vehicle speed is correlated with the target deceleration, indicating that the target deceleration increases as the vehicle speed is increased. When this map is used in the step 106, the regenerative braking torque is controlled while performing the feedback of the detected value of a change (deceleration) in the number of revolutions of four wheels so that the target deceleration determined according to the first control map is realized. Thus, when the first control map which correlates the vehicle speed with the target deceleration is used, the required deceleration is obtained regardless of the change in the vehicle conditions such as the vehicle weight and the road gradient, resulting in improving operability extensively. For example, when running at a high speed where a significant speed change is required, the target deceleration is set higher than when running at a lower speed as shown in this drawing, so that the vehicle driver is not required to frequently change the operation from depressing the accelerator pedal to depressing the brake pedal in order to change the vehicle speed as required. Further, the braking control system becomes more stable thanks to the feedback of the speed.

Figure 9:
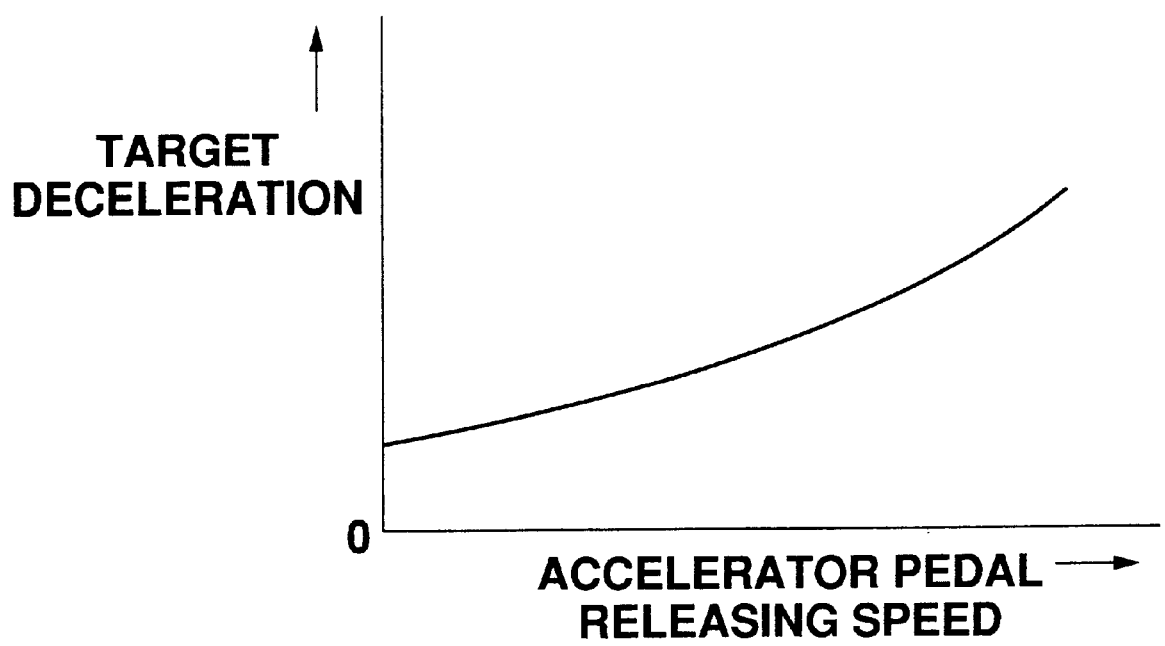

FIG. 9 shows another example of the first control map. It is seen that the accelerator pedal releasing speed is correlated with the target deceleration, indicating that the target deceleration increases as the accelerator pedal releasing speed is increased. When this map is used, both the advantages of the map shown in FIG. 5 and the map shown in FIG. 9 can be attained.

In the above description, respective parameters (vehicle speed etc.) are mere examples, and the tendency of changes in the target braking torque or target deceleration with respect to respective parameters can be determined during design. For example, a variable on the horizontal axis of each control map can be a distance from a forward obstruction (including other vehicles), a relative speed thereto, or a rate of change of the relative speed. In this case, each control map is preferably designed so that the braking torque or the deceleration becomes high when a forward obstruction tends to approach the vehicle. As another example, a variable of the horizontal axis of each control map can be a friction coefficient $\mu$ of a road surface. In this case, it is preferable to design each control map so that the braking torque or deceleration becomes small as the friction coefficient $\mu$ of a road surface becomes smaller. Besides, the control using $\mu$ is preferably carried out together with the control using the aforementioned respective parameters. Also, in order to facilitate practical use, it is preferable to use an outside air temperature, an operation frequency of ABS (anti-lock brake system), or an operation frequency of TRC (traction control system) instead of the friction coefficient $\mu$ of a road surface. Specifically, another variable which represents the friction coefficient $\mu$ of a road surface may be used. When the operation frequency of ABS or TRC is used, it is judged that $\mu$ is low as the operation frequency is high. More specifically, when the operation frequency is high while the leg power on the brake pedal (for ABS) or the accelerator pedal angle (for TRC) is small, it is judged that $\mu$ is small. Besides, respective parameters may be combined to configure and use a multidimensional map.

Although the above description shows an example of correlating e.g., the vehicle speed and the target braking torque as the second control map, the second control map can be modified according to the examples of FIG. 5 through FIG. 9. Further, in the second control map, the value of the target braking torque (or the target deceleration) is varied according to the value of the engine braking shift position signal, but when used in a vehicle which is not provided with the engine braking range, the second control map is a map having the content not giving such a change. Additionally, the parameter on the horizontal axis in the drawing used for the first control map is not required to match that for the second control map. Further, it is also possible to configure so that the target braking torque (or the target deceleration) is determined in the first control map, and the target deceleration (or the target braking torque) is determined in the second control map.

In the above embodiment, the parallel hybrid vehicle has been used, but the invention can be applied to a vehicle which can perform regenerative braking, namely a vehicle which uses a motor as the drive source. Therefore, the invention can be applied to a series hybrid vehicle, a pure electric vehicle, and other vehicles.

While there have been described that what are at present considered to be preferred embodiments of the invention, it will be understood that various modifications may be made thereto, and it is intended that the appended claims cover all such modifications as fall within the true spirit and scope of the invention.

What is claimed is:

1. A regenerative brake controller comprising:
   means for determining target braking torque based on a basic quantity which is at least one of, an accelerator pedal releasing speed, a road gradient, a vehicle weight, and a relative positional relation with a forward obstruction; and
   means for controlling regenerative braking torque to simulate internal combustion engine braking torque based on the target braking torque.

2. The regenerative brake controller according to claim 1 further comprising:
   a manual shift member for producing an engine braking shift position signal whose value is changed according to the operation by a user when the manual shift member is shifted in the engine braking range according to the operation by the user; and means for changing said target braking torque according to the value of said engine braking shift position signal when said manual shift member is in said engine braking range.

3. The regenerative brake controller according to claim 1 further comprising:

map means for correlating said basic quantity with the target braking torque;

wherein when the accelerator pedal is released, said target braking torque is determined with reference to said map means.

4. The regenerative brake controller according to claim 1, wherein the target braking torque is determined according to the accelerator pedal releasing speed when the accelerator pedal is released.

5. The regeneration brake controller of claim 1, including means for determining an accelerator pedal releasing speed.

6. The regeneration brake controller of claim 1, including means for determining a road gradient.

7. A regeneration brake controller comprising:

means for determining target deceleration based on a basic quantity which is at least one of an accelerator pedal releasing speed, and a relative positional relationship with a forward obstruction; and means for controlling regenerative braking to simulate internal combustion engine braking torque to realize said target deceleration.

8. The regenerative brake controller according to claim 7 further comprising:

a manual shift member for producing an engine braking shift position signal whose value is changed according to the operation by a user when the manual shift member is shifted in the engine braking range according to the operation by the user; and means for changing said target deceleration according to the value of said engine braking shift position signal when said manual shift member is in said engine braking range.

9. The regenerative brake controller according to claim 7 further comprising:

map means for correlating said basic quantity with the target deceleration;

wherein when the accelerator pedal is released, said target deceleration is determined with reference to said map means.

10. The regeneration brake controller of claim 7, including means for determining an accelerator pedal releasing speed.

11. The regeneration brake controller of claim 7, including means for determining a relative positional relationship with a forward obstruction.

* * * * *